April 28, 1959  R. W. TRICKLE, JR  2,884,477
MEANS FOR SPLICING ARMORED CABLES
Filed March 31, 1955  2 Sheets-Sheet 1

INVENTOR
RUSSELL W. TRICKLE, Jr.
BY
ATTORNEYS

April 28, 1959     R. W. TRICKLE, JR     2,884,477
MEANS FOR SPLICING ARMORED CABLES
Filed March 31, 1955     2 Sheets-Sheet 2
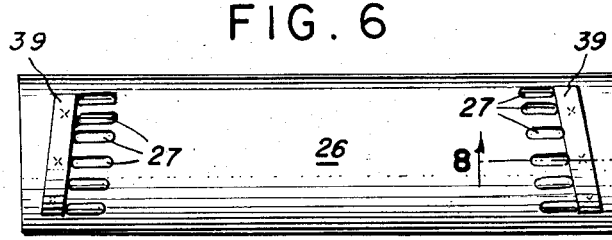
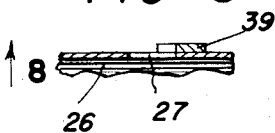
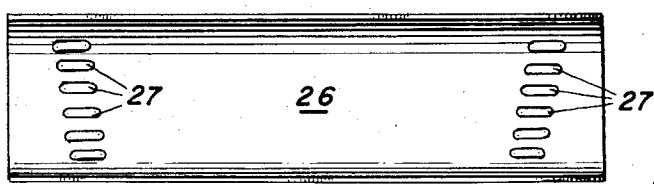
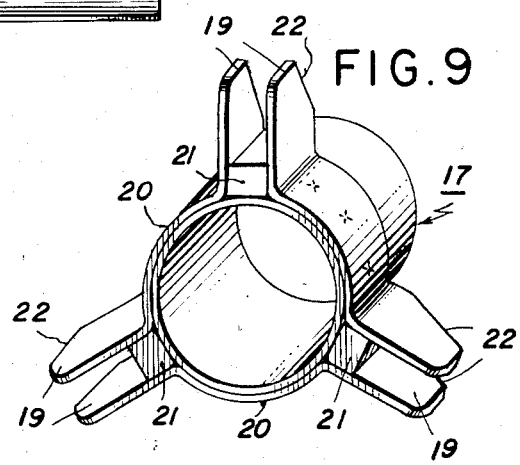
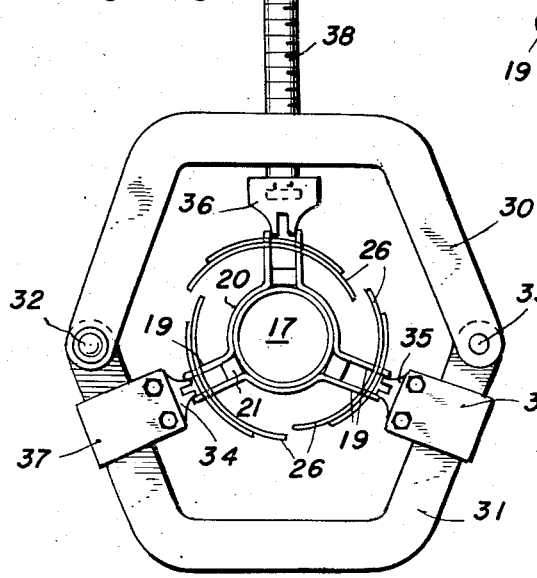
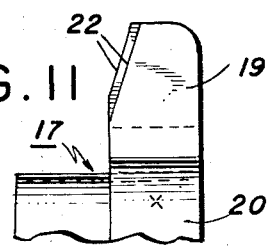
INVENTOR
RUSSELL W. TRICKLE, Jr.
BY
ATTORNEYS

United States Patent Office 2,884,477
Patented Apr. 28, 1959

2,884,477

MEANS FOR SPLICING ARMORED CABLES

Russell W. Trickle, Jr., Janesville, Wis., assignor to Dittmore-Freimuth Corp., Milwaukee, Wis., a corporation of Wisconsin Application March 31, 1955, Serial No. 498,198

8 Claims. (Cl. 174—89)

My invention relates to the splicing of armored cables of the type in which the conducting portion of the cable is surrounded by a plurality of armor wires which give strength and protection to the cable. Examples of the latter are coaxial cables, power cables and communication cables.

The invention is particularly useful in splicing coaxial conductor cables designated Type RG 85/U Armored Cables. Such a high frequency cable may have a braided outer conductor spaced from a central conductor by a thermo-plastic dielectric material such as polyethylene, the outer conductor being surrounded first by a thermoplastic sheath of polyvinyl or the like, then by a lead sheath and finally by a thick layer of impregnated jute strands in which layer the armor wires are embedded.

In splicing such a cable, the ends of the two conductors and of the dielectric, the vinyl and the lead sheaths are united in any preferred ways in the practice of this invention, since the latter relates particularly to joining of the armor wires of the two cable ends. The invention is therefore an improved joint or splice for the armored portion of the cable.

One object of the invention is to so connect the armor wires of the cable ends that the joint or splice will be very much stronger than prior splices, and at the same time, the internal parts of the cable will be relieved of stress.

Another object is to provide such an armor splice which may be quickly, easily and satisfactorily made by an unskilled operator.

With the above and other objects and advantages in view, the invention resides in the novel features of construction hereinafter described and claimed, and illustrated in the accompanying drawings which show the present preferred embodiment of the invention.

In the drawings:

Fig. 6 is an outer face view of one of the three segmental plates used in connection with tongued flanges or sleeves to draw the armor wires of the two cable ends toward each other and anchor them;

Fig. 7 is an inner face view of the segmental plate shown in Fig. 6;

Fig. 8 is a detail section taken on line 8—8 in Fig. 6;

Fig. 9 is a perspective view of one of the two tongued flanges or sleeves;

Fig. 10 is a face view of a tool used in making the armor splice, one of the tongued flanges and the three segmental plates being shown in end elevation and in operative positions with respect to the tool and the armor wires but the other parts of the splice and the cable being omitted; and Fig. 11 is a detail view showing the differences between the two bendable tongues or ears of each pair on the sleeve-like flange.

Figure 1:
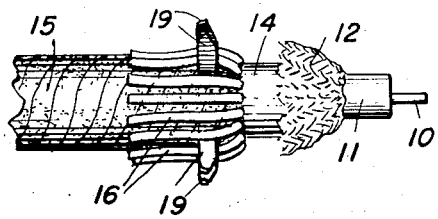
Fig. 1 is a side elevation of an armored coaxial cable end showing the parts as prepared for uniting two such cable ends.
Figure 2:
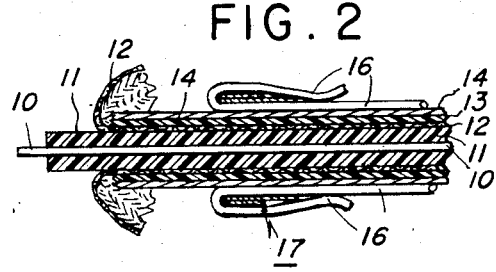
Fig. 2 is a longitudinal sectional view through such a prepared cable end, the outer covering being omitted.

Referring more particularly to Figs. 1, 2, 4 and 5, the coaxial cable shown therein comprises an inner conductor 10 surrounded by a polyethylene sheath 11, a tubular braided outer conductor 12 between the sheath 11 and a sheath 13 of polyvinyl or the like, a lead sheath 14 on the vinyl, a thick outer sheath or covering 15 of impregnated jute or the like and an annular series of armor wires 16 embedded in the jute which is applied in two layers to form the outer covering 15 of the cable. Figs. 1 and 2 show two cable ends that have been prepared for splicing, the several sheaths or jackets being cut back, the braided conductor being folded back and the armor wires being folded back as shown. The abutted inner conductors 10 are first soldered. The dielectric sheaths 12 are then joined. The braided conductor ends are then brought together and soldered. The two vinyl sheaths are then united. The lead sheaths are then united. All of these operations form no part of the present invention and may be performed in accordance with the method claimed in application Serial No. 439,752, filed June 28, 1954 in which I am one of the joint applicants, said application having matured in Patent No. 2,768,105, October 23, 1956, or they may be performed in any other suitable manner.

Figure 4:
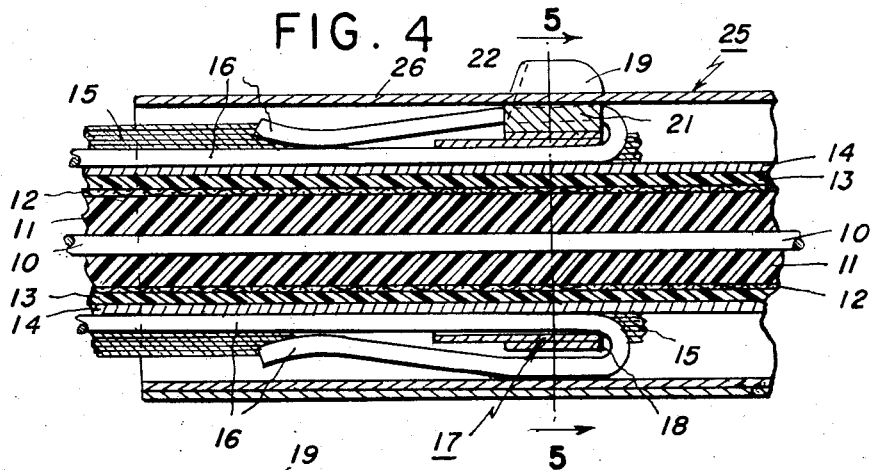
Fig. 4 is an enlarged detail longitudinal section through one end of the partially completed splice.

In the practice of my invention the jute strands may be either folded back or removed wholly or in part, and before bending back the armor wires 16 a tongued flange or sleeve 17, such as shown in Fig. 9, is telescoped over the wires and positioned so that its end 18 (Fig. 4) is at the point where the wires are to be bent back. If the jute strands are bent back they may be temporarily fastened by a wire clamp or other tie. The flange 17 is provided at its end 18 with two or more equally spaced pairs of outwardly projecting flat tongues 19, the tongues of each pair being spaced apart and being bendable for a purpose hereinafter described. The armor wires are first bent outwardly at right angles against the end 18 of the flange and are then bent back longitudinally upon themselves between the pairs of spaced ears or tongues 19. The annular series of wires usually consists of 24 strands so that 8 wires will be disposed in each of the spaces between the three pairs of tongues with the latter projecting outwardly from the wires, as shown in Figs. 1 and 4. If desired the bent end portions of the wires may be held by a wire clamp or the like. The tongues 19 are preferably formed by the ends of sheet metal strips which have arcuate intermediate portions 20 that are spot welded or otherwise fastened at one end of a cylindrical sheet metal sleeve which forms the body of the flange 17. Rectangular blocks 21 disposed between the bases of the tongues of each pair and suitably fastened to the tongues and the sleeve, brace the tongues, and in connection with the parts 20, strengthen the end 18 of the flange about which the wires are bent. The edges of the tongues adjacent the end 18 are preferably straight and may have slight rounded outer extremities, but the opposite edges 22 are inclined to provide cam edges for a purpose hereinafter explained.

Figure 3:
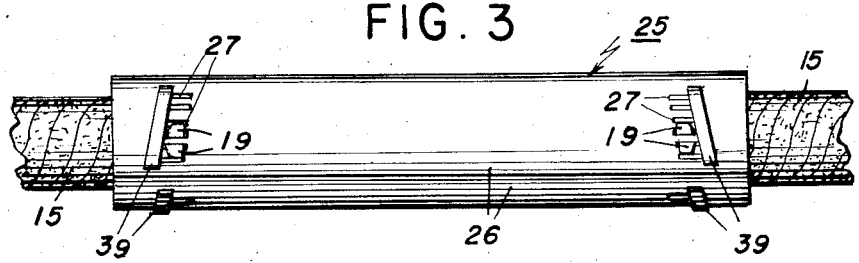
Fig. 3 is a side elevation of a partially completed cable splice to show the means for connecting the armor wires of the two cable ends and drawing the wires of the two ends toward each other to prevent stress of the two conductors.
Figure 5:
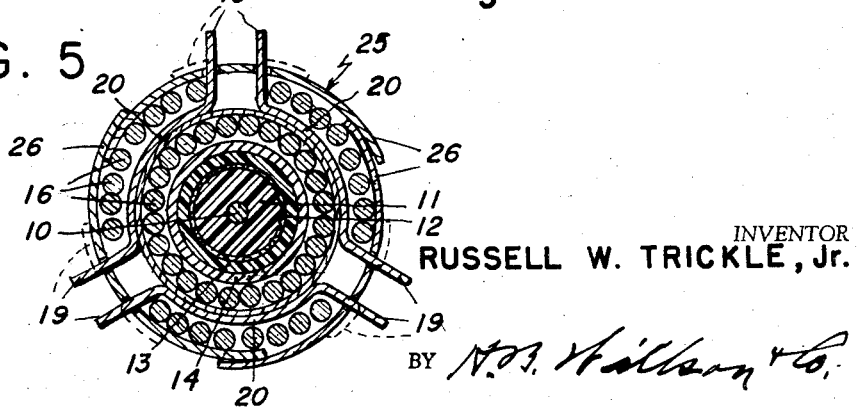
Fig. 5 is a transverse section taken on the line 5—5 in Fig. 4.

By bending the armor wires around the flanges 17, the latter become securely anchored to the wires and these parts form a portion of the armor splice by suitably connecting the two flanges. The preferred connection is the sectional armor shield or shell designated generally by the numeral 25. This shield not only connects the two flanges so that they cannot move away from each other in the completed joint, but preferably in a manner in which the two flanges are pulled toward each other during the formation of the armor splice, and thus the two conductors and the internal parts of the cable ends are relieved of stress. The flange connecting shield 25 is made of two or more sheet metal sections 26 of arcuate shape in cross section and of such width that when the preferably three sections are placed around the splice, the longitudinal edges of adjacent sections will overlap, as seen in Figs. 5 and 10. The sections are longer than the distance between the annular series of tongues on the two flanges 17, and in adjacent the ends of each section are at least two slots to receive the pairs of tongues 19, the projecting ends of the latter being bent, as seen in Fig. 3, to hold the parts assembled. However since it is highly desirable that the splice in the armor portion of the cable be such that all longitudinal strain on the cable be resisted by the armor, the arcuate or partly cylindrical sections of the shield or shell 25 are formed at their ends with oppositely inclined transverse rows of slots 27 as shown in Figs. 3, 6 and 7, and the tongues have the cam edges 22. At the time the wires 16 are bent back on the flanges care must be taken to have the tongues 19 on the two flanges in longitudinal alinement so that when the shell sections 26 are applied, the pairs of tongues may be inserted in those slots of the inclined rows of slots which will cause the oppositely inclined edges 22 of the longitudinally alined tongues of the flanges to draw the latter toward each other. The ends 18 of the flanges are thus drawn snugly against the bends in the armor wires and any slack in the latter is taken up.

In splicing the cable ends the latter are preferably held in alinement by spaced clamps on a work bench or table, and the flanges 17 for the right and left hand ends of the splice will thus be held with the tongues 19 of the two annular series in longitudinal alinement so that the person splicing the cable can use the slots 27 at the ends of the shell sections 26 which best fit the positions of the flanges. The two flanges are similar in appearance but the tongues of each pair are slightly different from each other because of the length of the inclined or cam edges 22, and the latter are differently positioned on the two flanges because of the opposite inclination of the rows of slots at the ends of each of the shell sections. The flat side faces of the outwardly projecting tongues 19 extend longitudinally of the splice and the slots 27 also extend longitudinally of the sections 26. The edges 22 of the tongues engage the outer ends of the slots, and since the rows of slots at the opposite ends of a section are oppositely inclined there is a different distance between the longitudinally alined slots on each section. The inclined edge 22 of one tongue of each pair is offset in a longitudinal direction with respect to the edge 22 of the other tongue of the pair according to the angular arrangement of the rows of slots 27. This will be clear on reference to Fig. 11. It is preferable to code color one of the flanges by dipping it in paint and to use the same color on one end of each of the three shell sections to indicate to the person assembling the splice which end is left or right. That will assure the user that the parts are in correct relationship. By holding the tongues on the two flanges in alinement, the shell sections 26 may be easily lapped shingle fashion around the cable using the sets of slots that are close as possible together on the armor sheath or shell. It is desirable to use the corresponding slots in each row so as to form a more balanced shell. The three sections may be temporarily held assembled by a wire tie or clamp applied adjacent each end of the shell, but prior to the application of the shell sections an impregnated jute tape is wrapped around the spliced inner portion of the cable to take the place of the inner layer of jute.

It will require force to move the three shell sections inwardly to cause the flanges to be pulled toward each other and also to bend the tongues and lock the shell sections down. This force is preferably supplied by the use of the tool shown in Fig. 10. The tool comprises two generally U-shaped frame sections 30 and 31 arranged in opposed relation to surround the splice. The sections are connected at one end by a pivot 32, and after they have been applied to the splice, their opposite overlapped ends are connected by a removable pin 33. Three equally spaced wedges 34, 35 and 36 are arranged substantially radially within the frame for insertion between the ends of the tongues of the three pairs, as seen in Fig. 10. The wedges 34 and 35 are mounted on bands 37 slidable on the two arms of the section 31. The third wedge 36 is swivelled on the inner end of a screw 38 threaded through the center of the section 30 and having a suitable handle at its outer end. With the parts positioned as diagrammatically shown in Fig. 10, the inward movement of the screw will cause the three wedges to first move the shell sections 26 inwardly so that the ends of the slots 27 in which the tongues 19 are disposed will ride downwardly on the inclined or cam edges 22 and thus pull the flanges 17 toward each other, and then further movement will cause the wedges to bend the tongues of each pair apart to lock the shell sections into the positions to which they have been forced. In this operation the wedges 34 and 35 will move toward each other as the slides 37 move downwardly along the arms of the section 31. In order to prevent the cam edges 22 from tearing or cutting the outer or remote ends of the slots, rectangular reinforcing strips of metal are spot welded on the exterior of the shell sections along the ends of the slots farthest away from each other. These strips extend along the outer ends of the slots of each row, and it will be noted that the slots at each end of the section are in longitudinal alinement. The slots 27 may have a length which corresponds to or is slightly less than the width of the lower or inner portions of the tongues 19 below their beveled edges 22, so that the tongues will have a tight fit in the slots, and thus the completed armor joint will be substantially rigid. After the tool has been used at each end of the splice the bent tongues may be hammered flat against the outer surfaces of the shell sections.

After the armor portion of the splice has been thus completed, impregnated jute tape is wrapped around the shell and beyond the ends of the latter to take the place of the outer layer of jute which was removed. If desired, the wire clamps used to hold the shell sections assembled, may be tightened and left on the splice to be covered by the tape. The bent back ends of the armor wire may, if desired, be surrounded by wire clamps, not shown, and these clamping wires are allowed to remain and give strength to the splice. A slushing compound may be spread over the wrapped tape and a wiping cloth used to help retain the slushing compound. When the solvent in the latter evaporates the outer covering of the finished splice will be in the same condition as the outer covering on the cable.

It will be noted that in carrying out my method the cable ends are first prepared as shown in Figs. 1 and 2, the armor wires being folded on the flanges 17 which thereafter become a part of the cable. The inner parts of the coaxial cable ends are then spliced. The shell sections are then applied over the projecting tongues of the two flanges and by applying force adjacent the ends of the tongues 19, the sections are simultaneously moved inwardly to draw the flanges toward each other and the ends of the tongues are bent to lock the sections so that there will be no looseness or slack in the armor portion of the spliced cable, and hence the interior parts will be relieved of any stress.

With respect to the means for drawing the two flanges toward each other to remove slack in the armor wires bent around them, the above described structure is preferably employed, but it will be obvious that bolts or other means may be employed to move the flanges 17 toward each other.

In the most commonly used prior armor wire splice, the bared wires of the two cable ends had to be very long since in making the splice these wires were overlapped over the splined inner portion of the cable. Thus a considerable length of the cable was required in making the armor joint. With this improved splice very little of the cable is wasted; and it has been found that the splice made in accordance with this invention is from two to three times as strong as the splice made by that old method. Further advantages are that the splice may be made in less time, no material part of the cable is lost, the armor wires are handled only once, and little skill is required of the operator to obtain a satisfactory splice.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. A splice for two ends of a cable having an inner portion surrounded by an annular series of armor wires, the inner portions of the cable ends being spliced, a sleeve-like flange surrounding the wires of each end at points spaced from the spliced inner portion, outwardly projecting bendable tongues on each flange, the wires of the two cable ends being bent back over the respective flanges between the tongues thereof, and a flange-connecting shell having sections of arcuate shape in cross section with slots to receive the tongues of the respective flanges, the outer portions of the tongues being bent to retain the sections relative to the flanges.

2. The structure of claim 1 in which said tongues are arranged in pairs equally spaced around each flange, the tongues of each pair having their outer portions bent in opposite directions.

3. The structure of claim 1 in which said tongues on the two flanges have their remote edges oppositely inclined to serve as cams which engage the ends of the slots and force the two flanges toward each other when the sections are moved inwardly on the tongues.

4. The structure of claim 3 in which a plurality of said slots are adjacent each end of each of said arcuate sections, the slots being arranged in transverse rows with the rows at the ends of each section oppositely inclined for selective reception of the tongues.

5. The structure of claim 4 in which each of said sections has reinforcing strips secured to the section and extending along the outermost ends of the slots of each of the inclined rows of slots.

6. The structure of claim 1 in which said tongues are arranged in pairs equally spaced around each flange, the tongues of the two flanges having their remote edges oppositely inclined, the inclined edges of the tongues of each pair being offset longitudinally of the splice, and in which a plurality of said slots are adjacent each end of each of said arcuate sections, the slots being arranged in transverse rows with the rows at the ends of each section oppositely inclined for the selective reception of the pairs of tongues.

7. The structure of claim 8 in which each of said flanges is a cylindrical sleeve, and said pairs of tongues are formed by the adjacent ends of strips with arcuate intermediate portions fastened to the exterior of the sleeve adjacent its end about which the armor wires are bent to reinforce said end.

8. The structure of claim 6 in which said arcuate sections of said shell have their adjacent longitudinal edges overlapped to enclose the bent back portions of the armor wires.

References Cited in the file of this patent

UNITED STATES PATENTS

| | | |
|---|---|---|
| 1,137,931 | Travers et al. | May 4, 1915 |
| 2,133,448 | Harley | Oct. 18, 1938 |
| 2,429,889 | Morrison | Oct. 28, 1947 |
| 2,530,381 | Donahue | Nov. 21, 1950 |